A. J. McGEHEE.
GASOLENE DISPENSING APPARATUS.
APPLICATION FILED OCT. 31, 1919.
1,383,137.
Patented June 28, 1921.
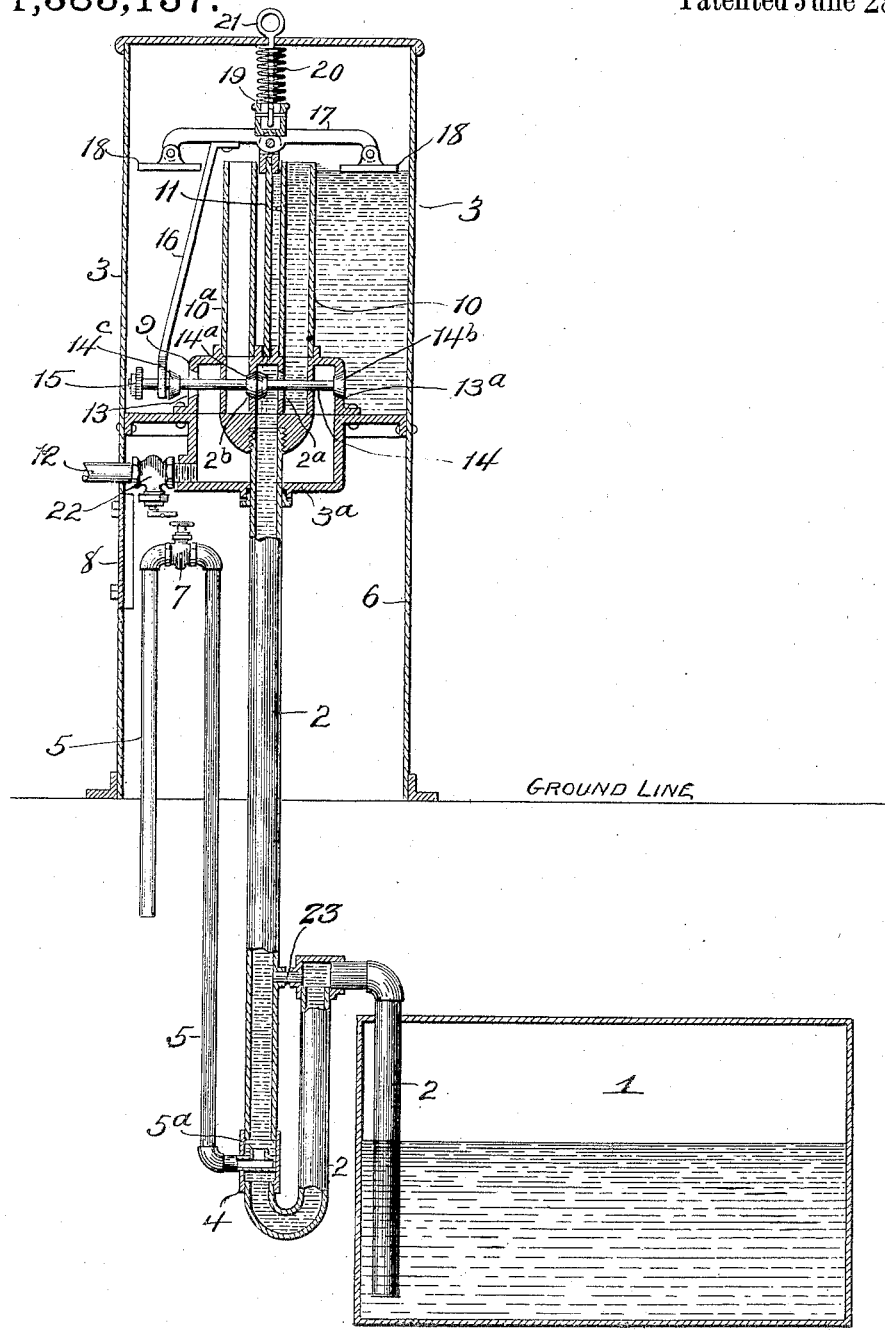
INVENTOR
A. J. McGehee
By Seymour & Bright
Attorneys

UNITED STATES PATENT OFFICE.

ABNER JUDSON McGEHEE, OF JACKSON, TENNESSEE.

GASOLENE-DISPENSING APPARATUS.

1,383,137. Specification of Letters Patent. Patented June 28, 1921.

Application filed October 31, 1919. Serial No. 334,710.

*To all whom it may concern:*

Be it known that I, ABNER J. McGEHEE, a citizen of the United States, and a resident of Jackson, in the county of Madison and State of Tennessee, have invented certain new and useful Improvements in Gasolene-Dispensing Apparatus; and I do hereby declare the following to be a full, clear, and exact description of the invention, such as will enable others skilled in the art to which it appertains to make and use the same.

My invention relates to an improvement in gasolene dispensing apparatus, the object being to provide an apparatus that will be easy to operate, and quickly deliver a measured quantity of gasolene, the amount to be delivered being visible to the purchaser, and it consists in a graduated dispensing tank elevated to deliver to a tank on a motor car by gravity, and means actuated by compressed air for forcing the gasolene from a main tank to the dispensing tank. It further consists in a duplex tank and means for filling, measuring and discharging any quantity of gasolene above the capacity of the tank in a continuous operation.

My invention further consists in the details of construction as will be more fully explained and pointed out in the claims.

The accompanying drawing is a view in vertical section of my improved apparatus.

1 represents the main tank which in the present instance is shown underground, and 2 is a pipe leading from the main tank to the dispensing tank 3. Pipe 2 terminates near the bottom of the main tank, and passes up through the top of the latter and then downwardly, and upwardly to tank 3, the lower U-shape bend in the pipe being preferably slightly above the plane of the open end of the pipe in tank 1. This U-shape bend in the pipe outside of the tank 1 constitutes a trap which is always full of gasolene when there is any gasolene in the tank 1, so that when air is applied as will be hereinafter explained, the flow of gasolene will be immediately started up pipe 2 toward the dispensing tank 3. Secured to pipe 2, and in the upwardly projecting member of the U-shaped trap above referred to, and forming a part of the latter, is the coupling 4, into which the air pipe 5 passes. This pipe 5 leads from an air reservoir, compressor or other source of air under pressure, and is preferably located underground and passes upwardly in stand 6 to a point within easy reach of the operator and then downwardly and into coupling 4, and is provided within the latter with an opening $5^a$ located in line with the portion of pipe 2 above the coupling 4. The coupling 4 is located well down in the U-shaped trap in pipe 2 so that it will always be full of gasolene, as will also the air pipe 5, the gasolene entering the latter through the opening $5^a$ and filling it up to the level of the gasolene in the U-shaped trap. The air pipe 5 is provided in the bend at its upper end with the valve 7 which is accessible through a door 8 at the front of the casing 6, so that when the door is locked the valve will be concealed and inaccessible.

Pipe 2 passes upwardly through the casing 6, and through the restricted neck $3^a$ of the dispensing tank 3, and terminates within the valve casing 9. This valve casing 9 forms a continuation upward within tank 3 of the restricted neck $3^a$ of said tank, and pipe 2 extends up into the latter and is provided with two oppositely disposed openings $2^a$ and $2^b$ through which the gasolene passes from pipe 2 into the branch pipes 10 and $10^a$. Branch pipes 10 and $10^a$ form in effect a bifurcated continuation of pipe 2 and pass upwardly through the closed top of the valve casing 9 and terminate within tank 3 near the upper end of the latter. Tank 3 is divided into two parts by a partition 11 which passes between the branch pipes 10 and $10^a$ so that pipe 10 discharges into one compartment of the tank and pipe $10^a$ into the other compartment. The partition 11 extends above the tops of the branch pipes 10 and $10^a$ and above the point the gasolene is supposed to rise in the tanks, so that after the gasolene has been discharged into either compartment of the tank it cannot pass therefrom except through the discharge pipe 12, which is provided with a valve 22 accessible through the door 8 of stand 6.

Valve casing 9 is provided with two oppositely disposed outlet openings 13 and $13^a$ which are in the plane of the outlet openings $2^a$ and $2^b$ in the upper end of pipe 2, and passing through said four openings is the valve stem 14 carrying three valves $14^a$, $14^b$, and $14^c$, the valve $14^a$ being within pipe 2 and adapted to coact with both openings $2^a$ and $2^b$ therein, so that when one of said openings is closed the other will be open, while the valves $14^b$ and $14^c$ are for respectively opening and closing the discharge openings 13ª and 13 in valve casing 9, the valves being so disposed on the stem 14 that when the inlet opening 2ᵇ in pipe 2 is closed by valve 14ª the discharge opening 13 in valve casing 9 will be open, and the opening 13ª will be closed by its valve, so that gasolene passing up pipe 2 would flow through opening 2ª into pipe 10 and from thence into the tank 3 while the gasolene on the opposite side of partition 11 in said tank will be free to pass out through opening 13 to discharge pipe 12.

Valve stem 14 is provided at one end with an adjustable nut 15, between which and the adjacent valve 14ᶜ, the lower forked end of the arm 16 has free movement. This arm 16 is secured to the walking beam 17 which carries the two floats 18, one in each compartment of the tank. The floats are centrally pivoted to the ends of the walking beam, so that as one rises the other falls, and maintain a horizontal position at all times, and the arm 16 is connected to the walking beam 17 or to the trunnions of the latter, so that it moves with the walking beam. Secured to the top of the walking beam or to the shaft or trunnion carrying the latter, is a thimble 19 to receive one end of a spring 20 the said spring being preferably carried on a rod 21 which passes through and has a loose connection with the top of tank 3. This spring is under compression and bears on the top of thimble 19, and operates when the thimble is moved by a rising float 18 to a point just past the center, to quickly throw the walking beam the remaining distance it can travel, and in this way move the arm 16 so as to rapidly shift the valve stem 14 from one position to the other.

The tank 3 which is supported on the stand 6 is graduated at each compartment to indicate the contents in gallons and is preferably made of glass or other transparent material, or provided with sight tubes so that the height of the gasolene in the compartment will be clearly visible and may be seen by the customers. It is provided at its restricted neck with a discharge pipe 12, to which the discharge hose (not shown) is attached, the pipe 12 being provided with a valve 22 for controlling the flow of gasolene from the tank.

All modern service stations have a compressed air reservoir and pumps for inflating tires and I take advantage of such apparatus for supplying air to the apparatus above described.

Normally the dispensing tank 3 is empty and gasolene stands in pipe 2 throughout the length of the U-shaped trap therein, the siphoning back of the gasolene in the trap, into tank 1, being prevented by connecting the upper ends of the U-shaped trap by an air pipe 23. The end of air pipe 5 within the three way coupling 4 is always submerged, hence when the air pressure is let into pipe 5 by opening valve 7, the air forces the gasolene up pipe 2 and into the tank, and when the gasolene in the U-shape trap is started upwardly, the suction causes a flow from the tank up through the submerged end of pipe 2, so that the flow of gasolene will be continuous as long as the air pressure is admitted to pipe 2. Each compartment of tank 3 may be adapted to hold any quantity of gasolene, but for convenience we will refer to each as having a capacity of five gallons and graduated to represent the gallons so as to measure any number of gallons less than five. If when the air is started, the valve rod 14 be in the position shown, that is, with the inlet opening 2ª open and discharge 2ᵇ closed, the gasolene will pass through valved opening 2ª into pipe 10 and be discharged into the compartment at the right hand side. If a quantity less than five gallons be desired the air should be shut off when the gasolene reaches the proper level as indicated on the graduated scale, and then by moving the rod 21 carrying the spring 20, the walking beam will be shifted and thus cause the arm 16 to strike valve 14ᶜ and shift the stem to the right, thus closing the valve opening 2ª from pipe 2 and opening the opening 2ᵇ. It also moves valve 14ᶜ to position to close discharge opening 13 in the valve casing 9 and moves valve 14ᵇ in a direction to open the discharge opening 13ª and thus permit the contents of the compartment to flow into the neck 3ª of the container and be withdrawn through the discharge pipe 12. If on the other hand any number of gallons above five be desired, the flow into the right hand compartment would be continued until the float 18 therein is elevated by its contact with the gasolene. As the float rises the walking beam 17 will be rocked thus moving arm 16 from its position adjacent the nut 15 toward valve 14ᶜ, and as the walking beam passes the horizontal position, the spring 20 immediately and instantaneously completes the movement. As the float in the right hand compartment is being elevated by the filling of the compartment, the arm 16 moves slowly toward valve 14ᶜ and reaches it at the time the walking beam is shifted by the spring so that the shifting movement of the valves is rapid and instantaneous hence there will be no appreciable leakage or loss from either compartment during the shifting movement of the valves. When the valve stem is thus shifted it opens discharge valve 14ᵇ in the filled compartment of the tank and closes discharge valve 14ᶜ. It also closes the inlet opening 2ª in pipe 2 and opens inlet opening 2ᵇ so that the gasolene will then pass up pipe 10ᵃ and be discharged in the left hand compartment, and if more than ten gallons be required, it will be permitted to fill, and shift the valves as above described so as to discharge from the left hand compartment and again fill the other.

With this construction the operation of filling and discharging a measured quantity above the capacity of one compartment of the tank is automatic and continuous and can be discontinued instantaneously by shutting off the air. It is only necessary for the operator to watch the tank and when the proper level has been reached, shut off the air. If this level be below the float, the valve can be shifted by hand to discharge the contents, whereas if it be the capacity of the compartment the discharge will be automatic.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In gasolene dispensing apparatus, the combination of a main tank, a dispensing tank, a pipe leading from the main tank near the bottom thereof and terminating in the dispensing tank, the said pipe having a trap intermediate the two tanks, and an air pipe terminating in the discharge pipe within the trap portion of the latter, and discharging the air upwardly therein.

2. In gasolene dispensing apparatus, the combination of a main tank, a dispensing tank, a pipe connecting said tanks and entering the main tank at the top and terminating near the bottom of the latter, the said pipe having a U-shape trap section located in the horizontal plane of the main tank, a pipe connecting the upper ends of the two members of the trap, and an air pipe terminating in the discharge pipe within the trap portion of the latter and discharging the air upwardly therein.

3. In gasolene dispensing apparatus, the combination of a main tank, a dispensing tank, a pipe connecting said tanks and passing into the main tank adjacent the top thereof and terminating near the bottom of the latter, and provided outside of said main tank with a U-shape trap section, an air pipe discharging upwardly into the uptake portion of the trap and a valve in said air pipe.

4. In gasolene dispensing apparatus of the character described, the combination of a main tank, a dispensing tank divided into two compartments, the latter discharging into a chamber common to both compartments, a supply pipe leading upwardly from the main tank into the dispensing tank and provided within the latter with two branch pipes, each discharging into a compartment, a single valve for opening communication between the main supply pipe and one branch pipe and closing communication with the other branch pipe and valve mechanism carried by the stem of said inlet valve for opening the discharge from one compartment and closing the other.

5. In a gasolene dispensing apparatus, the combination of a main tank, a two compartment dispensing tank, a discharge port for the latter, a supply pipe leading from the main tank up through the bottom of the dispensing tank and provided with a branch for each compartment of the dispensing tank, a float in each compartment, means connecting the floats whereby when one falls as the other rises, a single supply valve actuated by said floats for simultaneously opening one branch pipe and closing the other and valves actuated by the stem of said supply valve for closing the discharge port from one compartment and opening the other.

6. In a gasolene dispensing apparatus the combination of a main tank, a dispensing tank divided into two compartments, each having a discharge port, a supply pipe having a branch leading to each compartment, a stem provided with valve mechanism for opening communication between the supply pipe and one branch and closing communication between the supply pipe and the other branch, valves actuated by the stem of said valve mechanism for closing the discharge port of one compartment and opening the other, connected float mechanism within said compartments, trip mechanism for imparting final and quick movement to said float mechanism and means connecting said float mechanism and the said supply and discharge valves.

In testimony whereof, I have signed this specification in the presence of two subscribing witnesses.

ABNER JUDSON McGEHEE.

Witnesses:
Jno. M. Corrall,
Benj. Williams.